(12) United States Patent
Klostermann et al.

(10) Patent No.: US 11,851,583 B2
(45) Date of Patent: *Dec. 26, 2023

(54) PROCESS FOR PRODUCING POROUS POLYURETHANE COATINGS USING POLYOL ESTER ADDITIVES

(71) Applicant: Evonik Operations GmbH, Essen (DE)

(72) Inventors: Michael Klostermann, Essen (DE); Martin Glos, Borken (DE); Jan Marian Von Hof, Bochum (DE); Verena Dahl, Bergisch Gladbach (DE); Christian Eilbracht, Herne (DE); Oliver Springer, Wesel (DE); Hans Henning Wenk, Mülheim an der Ruhr (DE)

(73) Assignee: Evonik Operations GmbH, Essen (DE)

( * ) Notice: Subject to any disclaimer, the term of this patent is extended or adjusted under 35 U.S.C. 154(b) by 263 days.

This patent is subject to a terminal disclaimer.

(21) Appl. No.: 16/315,744

(22) PCT Filed: Jul. 13, 2017

(86) PCT No.: PCT/EP2017/067655
§ 371 (c)(1),
(2) Date: Jan. 7, 2019

(87) PCT Pub. No.: WO2018/015260
PCT Pub. Date: Jan. 25, 2018

(65) Prior Publication Data
US 2019/0300728 A1    Oct. 3, 2019

(30) Foreign Application Priority Data
Jul. 19, 2016  (EP) .................................... 16180041

(51) Int. Cl.
| | |
|---|---|
| *B05D 5/00* | (2006.01) |
| *B05D 3/02* | (2006.01) |
| *C09D 7/65* | (2018.01) |
| *C09D 7/45* | (2018.01) |
| *C09D 7/47* | (2018.01) |
| *C09D 5/00* | (2006.01) |
| *C09D 175/06* | (2006.01) |
| *D06N 3/00* | (2006.01) |
| *D06N 3/14* | (2006.01) |
| *C08L 75/04* | (2006.01) |
| *C09D 175/04* | (2006.01) |

(52) U.S. Cl.
CPC ............ *C09D 7/65* (2018.01); *B05D 3/0254* (2013.01); *B05D 5/00* (2013.01); *C08L 75/04* (2013.01); *C09D 5/00* (2013.01); *C09D 7/45* (2018.01); *C09D 7/47* (2018.01); *C09D 175/04* (2013.01); *C09D 175/06* (2013.01); *D06N 3/0047* (2013.01); *D06N 3/14* (2013.01); *B05D 2320/00* (2013.01); *B05D 2503/00* (2013.01); *C08L 2201/54* (2013.01)

(58) Field of Classification Search
CPC .......... C09D 7/65; C09D 175/04; C09D 7/45; C09D 7/47; C09D 5/00; C09D 175/06; C09D 7/40; B05D 3/0254; B05D 5/00; B05D 2503/00; B05D 2320/00; C08L 75/04; C08L 2201/54; D06N 3/0047; D06N 3/14; D06N 3/0043; D06N 3/005; D06N 3/0088; D06N 3/142; D06N 2211/28
USPC ...................................... 428/423.1, 613, 904
See application file for complete search history.

(56) References Cited

U.S. PATENT DOCUMENTS

| | | | |
|---|---|---|---|
| 3,580,855 A | 5/1971 | Mickus et al. | |
| 4,094,685 A | 6/1978 | Ester et al. | |
| 5,254,301 A * | 10/1993 | Sessions | ................ C08G 18/10 264/55 |
| 5,679,418 A * | 10/1997 | Akasawa | ................ C08L 75/12 427/389 |
| 6,800,384 B2 * | 10/2004 | Suzuki | ................ C09D 175/04 428/161 |
| 6,852,418 B1 * | 2/2005 | Zurbig | ................ D06N 3/145 428/424.8 |

(Continued)

FOREIGN PATENT DOCUMENTS

| | | |
|---|---|---|
| CA | 3028512 A1 | 12/2017 |
| EP | 1 283 296 A1 | 2/2003 |

(Continued)

OTHER PUBLICATIONS

Hasenhuettl, G. L.; Hartel, R. W. In Food Emulsifiers and Their Applications; Hasenhuettl, G. L., Ed.; Springer, 2008; pp. 10-37. (Year: 2008).*

(Continued)

*Primary Examiner* — William P Fletcher, III
(74) *Attorney, Agent, or Firm* — Grüneberg and Myers PLLC

(57) ABSTRACT

The invention relates to a process for producing a porous polyurethane coatings, using a polyol ester as additives in an aqueous polymer dispersion, the process comprising the steps of a) providing a mixture comprising an aqueous polymer dispersion, a polyol ester, and an additive, b) foaming the mixture to give a homogeneous, fine-cell foam, c) adding at least one thickener to establish the desired viscosity of the wet foam, d) applying a coating of the foamed polymer dispersion to a suitable carrier, e) drying the coating. The invention further relates to a phosphorylated polyol ester.

14 Claims, No Drawings

(56) References Cited

U.S. PATENT DOCUMENTS

| | | | |
|---|---|---|---|
| 6,863,953 B2 * | 3/2005 | Mori | B32B 27/065 428/161 |
| 7,671,103 B2 | 3/2010 | Eilbracht et al. | |
| 7,838,566 B2 | 11/2010 | Glos et al. | |
| 7,847,123 B2 | 12/2010 | Wenk et al. | |
| 7,994,110 B2 | 8/2011 | Wenk et al. | |
| 8,030,366 B2 | 10/2011 | Ferenz et al. | |
| 8,138,372 B2 | 3/2012 | Herrwerth et al. | |
| 8,227,399 B2 * | 7/2012 | Wenk | D06M 15/53 510/505 |
| 8,303,843 B2 | 11/2012 | Glos et al. | |
| 8,334,355 B2 | 12/2012 | Henning et al. | |
| 8,349,907 B2 | 1/2013 | Henning et al. | |
| 8,420,137 B2 | 4/2013 | Wenk et al. | |
| 8,557,944 B2 | 10/2013 | Tenning et al. | |
| 8,609,798 B2 | 12/2013 | Knott et al. | |
| 8,623,984 B2 | 1/2014 | Henning et al. | |
| 8,642,525 B2 | 2/2014 | Herrwerth et al. | |
| 8,642,659 B2 | 2/2014 | Springer et al. | |
| 8,653,289 B2 | 2/2014 | Wenk et al. | |
| 8,664,175 B2 | 3/2014 | Wenk et al. | |
| 8,703,159 B2 | 4/2014 | Wenk et al. | |
| 8,735,458 B2 | 5/2014 | Glos et al. | |
| 8,883,712 B2 | 11/2014 | Koehle et al. | |
| 8,906,974 B2 | 12/2014 | Glos et al. | |
| 8,912,277 B2 | 12/2014 | Glos | |
| 8,921,437 B2 | 12/2014 | Knott et al. | |
| 8,946,310 B2 | 2/2015 | Glos et al. | |
| 8,946,311 B2 | 2/2015 | Schiller et al. | |
| 8,957,121 B2 | 2/2015 | Schiller et al. | |
| 8,969,502 B2 | 3/2015 | Knott et al. | |
| 8,993,792 B2 | 3/2015 | Hartung et al. | |
| 9,011,826 B2 | 4/2015 | Springer et al. | |
| 9,056,952 B2 | 6/2015 | Eilbracht et al. | |
| 9,109,051 B2 | 8/2015 | Wenk et al. | |
| 9,138,385 B2 | 9/2015 | Dahl et al. | |
| 9,217,074 B2 | 12/2015 | Glos et al. | |
| 9,243,212 B2 | 1/2016 | Kuppert et al. | |
| 9,353,289 B2 | 5/2016 | De Gans et al. | |
| 9,409,853 B2 | 8/2016 | Schuch et al. | |
| 9,427,385 B2 | 8/2016 | Meyer et al. | |
| 9,434,755 B2 | 9/2016 | Schilling et al. | |
| 9,505,895 B2 | 11/2016 | Schmitz et al. | |
| 9,616,007 B2 | 4/2017 | Herrwerth et al. | |
| 9,725,538 B2 | 8/2017 | Klostermann et al. | |
| 9,738,797 B2 | 8/2017 | Nilewski et al. | |
| 9,745,251 B2 | 8/2017 | Klostermann et al. | |
| 9,776,951 B2 | 10/2017 | Friedrich et al. | |
| 9,889,417 B2 | 2/2018 | Baseeth | |
| 9,963,425 B2 | 5/2018 | Jaworska-Maslanka et al. | |
| 10,023,679 B2 | 7/2018 | Klostermann et al. | |
| 10,292,925 B2 | 5/2019 | Gu et al. | |
| 10,787,464 B2 | 9/2020 | Fiedel et al. | |
| 10,793,662 B2 | 10/2020 | Günther et al. | |
| 10,870,723 B2 | 12/2020 | Glos | |
| 10,941,173 B2 | 3/2021 | Lu et al. | |
| 10,988,713 B2 | 4/2021 | Schilling et al. | |
| 11,155,842 B2 | 10/2021 | Eckstein et al. | |
| 2006/0079635 A1 | 4/2006 | Pohl et al. | |
| 2007/0021581 A1 | 1/2007 | Eilbracht et al. | |
| 2007/0123599 A1 | 5/2007 | Eilbracht et al. | |
| 2008/0108709 A1 | 5/2008 | Meyer et al. | |
| 2009/0088488 A1 | 4/2009 | Bruckner et al. | |
| 2009/0088565 A1 | 4/2009 | Schick et al. | |
| 2009/0104294 A1 | 4/2009 | Wenk et al. | |
| 2010/0029587 A1 | 2/2010 | Brueckner et al. | |
| 2010/0036011 A1 | 2/2010 | De Gans et al. | |
| 2010/0068160 A1 | 3/2010 | Springer et al. | |
| 2010/0240786 A1 | 9/2010 | Glos et al. | |
| 2010/0266518 A1 | 10/2010 | Springer et al. | |
| 2011/0054055 A1 | 3/2011 | Schmitz et al. | |
| 2011/0062370 A1 | 3/2011 | Eilbracht et al. | |
| 2011/0206623 A1 | 8/2011 | Wenk et al. | |
| 2011/0257280 A1 | 10/2011 | Glos et al. | |
| 2011/0306694 A1 | 12/2011 | Glos et al. | |
| 2012/0021960 A1 | 1/2012 | Wenk et al. | |
| 2012/0037036 A1 | 2/2012 | Veit et al. | |
| 2012/0122758 A1 * | 5/2012 | Andjelic | A61Q 19/10 510/513 |
| 2012/0134948 A1 | 5/2012 | Springer et al. | |
| 2012/0153210 A1 | 6/2012 | Glos et al. | |
| 2012/0258155 A1 | 10/2012 | Wenk et al. | |
| 2012/0264843 A1 | 10/2012 | Glos | |
| 2012/0308503 A1 | 12/2012 | Wenk et al. | |
| 2013/0035407 A1 | 2/2013 | Lobert et al. | |
| 2013/0068990 A1 | 3/2013 | Eilbracht et al. | |
| 2013/0071340 A1 | 3/2013 | Wenk et al. | |
| 2014/0039071 A1 | 2/2014 | Thum et al. | |
| 2015/0057384 A1 | 2/2015 | Glos et al. | |
| 2015/0118173 A1 | 4/2015 | Farwick et al. | |
| 2015/0284902 A1 | 10/2015 | Bhattacharjee et al. | |
| 2016/0083333 A1 | 3/2016 | Schwab et al. | |
| 2016/0096939 A1 | 4/2016 | Glos et al. | |
| 2016/0152739 A1 | 6/2016 | Eilbracht et al. | |
| 2016/0213600 A1 | 7/2016 | Klostermann et al. | |
| 2016/0319094 A1 | 11/2016 | Diendorf et al. | |
| 2016/0326330 A1 | 11/2016 | Schuette et al. | |
| 2017/0112123 A1 | 4/2017 | Klostermann et al. | |
| 2017/0152343 A1 | 6/2017 | Günther et al. | |
| 2017/0174817 A1 | 6/2017 | Günther et al. | |
| 2017/0202770 A1 | 7/2017 | Friedrich et al. | |
| 2017/0226264 A1 | 8/2017 | Günther et al. | |
| 2017/0295782 A1 | 10/2017 | Klostermann et al. | |
| 2017/0306264 A1 | 10/2017 | Peggau et al. | |
| 2017/0335238 A1 | 11/2017 | Schilling et al. | |
| 2018/0016406 A1 | 1/2018 | Lüthge et al. | |
| 2018/0016525 A1 | 1/2018 | Scheuermann et al. | |
| 2018/0023040 A1 | 1/2018 | Schilling et al. | |
| 2018/0036218 A1 | 2/2018 | Gu et al. | |
| 2018/0162982 A1 | 6/2018 | Glos | |
| 2018/0194889 A1 | 7/2018 | Günther et al. | |
| 2018/0216023 A1 | 8/2018 | Maier et al. | |
| 2018/0327563 A1 | 11/2018 | Klostermann et al. | |
| 2018/0344602 A1 | 12/2018 | Schuch et al. | |
| 2019/0202771 A1 | 7/2019 | Von Hof et al. | |
| 2019/0233571 A1 | 8/2019 | Diendorf et al. | |
| 2019/0269158 A1 | 9/2019 | Schilling et al. | |
| 2020/0155436 A1 | 5/2020 | Hartung et al. | |
| 2020/0207938 A1 | 7/2020 | Klostermann et al. | |
| 2020/0214959 A1 | 7/2020 | Lu et al. | |
| 2020/0239621 A1 | 7/2020 | Glos | |
| 2021/0047474 A1 | 2/2021 | Klostermann et al. | |
| 2021/0337835 A1 | 11/2021 | Schilling et al. | |
| 2021/0371773 A1 | 12/2021 | Brandt et al. | |
| 2021/0403493 A1 | 12/2021 | Klostermann et al. | |
| 2021/0403673 A1 | 12/2021 | Klostermann et al. | |
| 2021/0403676 A1 | 12/2021 | Klostermann et al. | |
| 2021/0403678 A1 | 12/2021 | Klostermann et al. | |

FOREIGN PATENT DOCUMENTS

| | | | |
|---|---|---|---|
| EP | 3047845 A1 | 7/2016 | |
| EP | 3173205 A1 | 5/2017 | |
| JP | S53-34863 A | 3/1978 | |
| JP | S61-72003 A | 4/1986 | |
| JP | 2015-529537 A | 10/2015 | |
| TW | 583375 B | 4/2004 | |
| WO | 02/33001 A1 | 4/2002 | |
| WO | WO-0233001 A1 * | 4/2002 | C08G 18/0809 |
| WO | 2006/117386 A1 | 11/2006 | |
| WO | 2011/032924 A1 | 3/2011 | |
| WO | 2012/031868 A1 | 3/2012 | |
| WO | 2012/034753 A1 | 3/2012 | |
| WO | 2013/113685 A1 | 8/2013 | |
| WO | 2013/156237 A2 | 10/2013 | |
| WO | 2013/173447 A1 | 11/2013 | |
| WO | WO-2013173447 A1 * | 11/2013 | A61Q 19/00 |
| WO | 2015/0028295 A1 | 3/2015 | |
| WO | 2016/020140 A2 | 2/2016 | |
| WO | 2016/020200 A1 | 2/2016 | |
| WO | 2016/020201 A1 | 2/2016 | |
| WO | 2017/020137 A1 | 2/2016 | |
| WO | 2017/133868 A1 | 8/2017 | |
| WO | 2017/144317 A1 | 8/2017 | |

(56) References Cited

FOREIGN PATENT DOCUMENTS

| WO | 2017/144318 A1 | 8/2017 |
|----|----------------|--------|
| WO | 2017/144340 A1 | 8/2017 |
| WO | 2017/147219 A1 | 8/2017 |
| WO | 2017/220332 A1 | 12/2017 |
| WO | 2018/001680 A1 | 1/2018 |
| WO | 2018/015260 A1 | 1/2018 |
| WO | 2018/033259 A1 | 2/2018 |
| WO | 2018/065314 A1 | 4/2018 |
| WO | 2018/145966 A1 | 8/2018 |

OTHER PUBLICATIONS

Shrestha, L. K.; Dulle, M.; Glatter, O.; Aramaki, K. Structure of Polyglycerol Oleic Acid Ester Nonionic Surfactant Reverse Micelles in Decane: Growth Control by Headgroup Size. Langmuir 2010, 26 (10), 7015-7024. (Year: 2010).*
Diendorf et al., U.S. Appl. No. 16/312,315, filed Dec. 21, 2018.
German language Written Opinion dated Oct. 20, 2017 in PCT/EP2017/067655 (6 pages).
International Search Report dated Oct. 20, 2017 in PCT/EP2017/067655 (2 pages).
Liebig et al., U.S. Appl. No. 16/312,480, filed Dec. 21, 2018.
Lu et al., U.S. Appl. No. 16/074,828, filed Aug. 2, 2018.
English translation of Japanese Office Action dated Mar. 26, 2021 for JP Application No. 2019-502608 (4 pages).
Shrestha et al., "Structure of Polyglycerol Oleic Acid Ester Nonionic Surfactant Reverse Micelles in Decane: Growth Control by Headgroup Size," copyright 2010, 26(10), 7015-7024 (10 pages).
Eckstein et al., U.S. Appl. No. 17/497,484, filed Oct. 8, 2021.
Ferenz et al., U.S. Appl. No. 17/523,059, filed Nov. 10, 2021.
Glos et al., U.S. Appl. No. 17/414,678, filed Jun. 16, 2021.
Glos et al., U.S. Appl. No. 17/414,726, filed Jun. 16, 2021.
Klostermann et al., U.S. Appl. No. 17/612,663, filed Nov. 19, 2021.
Klostermann et al., U.S. Appl. No. 17/612,690, filed Nov. 19, 2021.
Klostermann et al., U.S. Appl. No. 17/617,020, filed Dec. 7, 2021.
Klostermann et al., U.S. Appl. No. 17/617,127, filed Dec. 7, 2021.
Lobert et al., U.S. Appl. No. 17/706,552, filed Mar. 28, 2022.

* cited by examiner

PROCESS FOR PRODUCING POROUS POLYURETHANE COATINGS USING POLYOL ESTER ADDITIVES

CROSS REFERENCE TO RELATED APPLICATIONS

This application is a 35 U.S.C. § 371 U.S. national phase entry of International Application PCT/EP2017/067655 having an international filing date of Jul. 13, 2017, which claims the benefit of European Application No. 16180041.2 filed Jul. 19, 2016, each of which is incorporated herein by reference in its entirety.

FIELD

The present invention is in the field of plastics coatings, synthetic leathers and polyol esters.

It relates more particularly to the production of porous polymer coatings, especially porous polyurethane coatings, using polyol esters as additives.

BACKGROUND

Textiles coated with plastics, for example synthetic leathers, generally consist of a textile carrier onto which is laminated a porous polymer layer which has in turn been coated with a top layer or a topcoat.

The porous polymer layer in this context preferably has pores in the micrometre range and is air-permeable and hence breathable, i.e. permeable to water vapour, but water-resistant. The porous polymer layer often comprises porous polyurethane. At present, porous polyurethane layers are usually produced by a coagulation method in which DMF is used as solvent. Owing to environmental concerns, however, this production method is being increasingly criticized, and so it should be succeeded gradually by other, more environmentally friendly technologies. One of these technologies is based on aqueous polyurethane dispersions, called PUDs. These generally consist of polyurethane microparticles dispersed in water; the solids content is usually in the range of 30-60% by weight. For production of a porous polyurethane layer, these PUDs are mechanically foamed, coated onto a carrier (layer thicknesses typically between 300-2000 µm) and then dried at elevated temperature. During this drying step, there is evaporation of the water present in the PUD system, which results in formation of a film of the polyurethane particles. In order to further increase the mechanical strength of the film, it is additionally possible to add hydrophilic (poly)isocyanates to the PUD system during the production process, and these can react with free OH radicals present on the surface of the polyurethane particles during the drying step, thus leading to additional crosslinking of the polyurethane film.

Both the mechanical and the tactile properties of PUD coatings thus produced are determined to a crucial degree by the cell structure of the porous polyurethane film. In addition, the cell structure of the porous polyurethane film affects the air permeability and breathability of the material. Particularly good properties can be achieved here with very fine, homogeneously distributed cells. A customary way of influencing the cell structure during the above-described production process is to add surfactants to the PUD system before or during the mechanical foaming. A first effect of appropriate surfactants is that sufficient amounts of air can be beaten into the PUD system during the foaming operation. Secondly, the surfactants have a direct effect on the morphology of the air bubbles thus produced. The stability of the air bubbles is also influenced to a crucial degree by the type of surfactant. This is important especially during the drying of foamed PUD coatings, since it is possible in this way to prevent drying effects such as cell coarsening or drying cracks.

The prior art discloses a number of ionic and nonionic surfactants which can be used for production of porous, PUD-based textile composite materials. Especially preferred in this context are usually anionic surfactants based on ammonium stearate; see, for example, US 2015/0284902 A1 or US 2006/0079635 A1.

However, the use of ammonium stearate is associated with various disadvantages. Firstly, ammonium stearate is susceptible to hard water. In polymer dispersions containing calcium ions, it is possible here for insoluble calcium soaps to form, which results in flocculation or gelation of the polymer dispersions. Synthetic leather produced on the basis of ammonium stearate, moreover, has the disadvantage that calcium soaps can form at the synthetic leather surface on contact with hard water, and these are manifested as white spots. This is undesirable especially in the case of dark-coloured synthetic leather. Furthermore, ammonium stearate has the disadvantage that it has quite a high migration capacity in the dried polyurethane film. Especially on contact with water, it is possible here for a lubrication film, which is perceived as unpleasant, to arise at the surface of the synthetic leather coating. A further disadvantage of ammonium stearate is that it generally has to be used in combination with other surfactants in order to be able to arrive at an adequate foam stability at all; the prior art here describes sulphosuccinamates, for example. These additional components lead to elevated complexity in use.

SUMMARY

The problem addressed by the present invention was therefore that of enabling efficient foaming of PUD systems without having to accept the disadvantages detailed in the prior art that are associated with the use of ammonium stearate. It has been found that, surprisingly, the use of polyol esters enables the solution of the stated problem.

DETAILED DESCRIPTION

The present invention therefore provides for the use of polyol esters as additives in aqueous polymer dispersions for production of porous polymer coatings, preferably for production of porous polyurethane coatings. The porous polymer layer to be produced in accordance with the invention (i.e. the porous polymer coating) here preferably has pores in the micrometre range, the mean cell size preferably being less than 150 µm, preferably less than 120 µm, especially preferably less than 100 µm, most preferably less than 75 µm. The preferred layer thickness is in the range of 10-10, 000 µm, preferably of 50-5000 µm, further preferably of 75-3000 µm, especially of 100-2500 µm.

The inventive use of the polyol esters surprisingly has various advantages.

It enables efficient foaming of the polymer dispersion. The foams thus produced are notable here for an exceptionally fine pore structure with particularly homogeneous cell distribution, which in turn has a very advantageous effect on the mechanical and tactile properties of the porous polymer coatings which have been produced on the basis of these foams. In addition, it is possible in this way to improve the air permeability or breathability of the coating.

A further advantage of the polyol esters for use in accordance with the invention is that they enable the production of particularly stable foams. This firstly has an advantageous effect on their processibility. Secondly, the elevated foam stability has the advantage that, during the drying of corresponding foams, drying defects such as cell coarsening or drying cracks can be avoided. Furthermore, the improved foam stability enables quicker drying of the foams, which offers processing advantages both from an environmental and from an economic point of view.

Yet another advantage of the polyol esters for use in accordance with the invention is that they are no longer capable of migration in the dried polymer film, especially polyurethane film, particularly when additional (hydrophilic) (poly)isocyanates are added to the system during the drying.

An additional advantage of the polyol esters for use in accordance with the invention is that they can lead to an increase in viscosity of the foamed, undried dispersion. This in turn can have an advantageous effect on the processibility of the foam. Furthermore, as the case may be, it may be possible as a result to dispense with the use of additional thickeners for adjusting the foam viscosity, or to reduce the use concentration thereof, which brings economic advantages.

Yet another advantage of the polyol esters for use in accordance with the invention is that they have low susceptibility, if any at all, to hard water.

A further advantage of the polyol esters for use in accordance with the invention is that they lead to adequate stabilization of foams based on aqueous polymer dispersions even without the use of further surfactants. This can reduce the complexity in the assembly of a suitable foam formulation on the part of the user.

The term "polyol esters" in the context of the overall present invention also encompasses the alkoxylated adducts thereof, which can be obtained by reaction of a polyol ester with alkylene oxides, for example ethylene oxide, propylene oxide and/or butylene oxide.

The term "polyol esters" in the context of the entire present invention also encompasses the ionic derivatives thereof, preferably the phosphorylated and sulphated derivatives, especially phosphorylated polyol esters. These derivatives of the polyol esters, especially phosphorylated polyol esters, are polyol esters usable with preference in accordance with the invention. These and further derivatives of the polyol esters are described in detail hereinafter, and are usable with preference in the context of the invention.

The invention is described further and by way of example hereinafter, without any intention that the invention be restricted to these illustrative embodiments. When ranges, general formulae or classes of compounds are specified below, these are intended to encompass not only the corresponding ranges or groups of compounds which are explicitly mentioned but also all subranges and subgroups of compounds which can be derived by leaving out individual values (ranges) or compounds. When documents are cited in the context of the present description, the contents thereof, particularly with regard to the subject-matter that forms the context in which the document has been cited, are considered in their entirety to form part of the disclosure content of the present invention. Unless stated otherwise, percentages are figures in percent by weight. When parameters which have been determined by measurement are reported below, the measurements have been determined at a temperature of 25° C. and a pressure of 101 325 Pa, unless stated otherwise.

In the context of the present invention, preference is given especially to those polyesters that are obtainable by the esterification of a polyol with at least one carboxylic acid. This corresponds to a preferred embodiment of the invention.

Preferred polyols used for preparation of the polyol esters according to the invention are selected from the group of the $C_3$-$C_8$ polyols and the oligomers and/or co-oligomers thereof. Co-oligomers result from reaction of different polyols, for example from reaction of propylene glycol with arabitol. Especially preferred polyols here are propane-1,3-diol, propylene glycol, glycerol, trimethylolethane, trimethylolpropane, sorbitan, sorbitol, isosorbide, erythritol, threitol, pentaerythritol, arabitol, xylitol, ribitol, fucitol, mannitol, galactitol, iditol, inositol, volemitol and glucose. Very particular preference is given to glycerol. Preferred polyol oligomers are oligomers of $C_3$-$C_8$ polyols having 1-20, preferably 2-10 and more preferably 2.5-8 repeat units. Especially preferred here are diglycerol, triglycerol, tetraglycerol, pentaglycerol, dierythritol, trierythritol, tetraerythritol, di(trimethylolpropane), tri(trimethylolpropane) and di- and oligosaccharides. Very particular preference is given to sorbitan and oligo- and/or polyglycerols. In particular, it is possible to use mixtures of different polyols. Furthermore, it is also possible to obtain alkoxylated adducts of $C_3$-$C_8$ polyols, the oligomers and/or co-oligomers thereof for preparation of the polyesters according to the invention, which can be obtained by reaction of $C_3$-$C_8$ polyols, the oligomers and/or co-oligomers thereof with alkylene oxides, for example ethylene oxide, propylene oxide and/or butylene oxide.

For preparation of the polyol esters according to the invention, it is possible to use monocarboxylic acids and/or polyfunctional di- and/or tricarboxylic acids. Preferred carboxylic acids used for preparation of the polyol esters according to the invention correspond to the general form R—C(O)OH where R is a monovalent aliphatic saturated or unsaturated hydrocarbyl radical having 3 to 39 carbon atoms, preferably 7 to 21 and more preferably 9 to 17 carbon atoms. Especially preferred here are carboxylic acids selected from butyric acid (butanoic acid), caproic acid (hexanoic acid), caprylic acid (octanoic acid), capric acid (decanoic acid), lauric acid (dodecanoic acid), myristic acid (tetradecanoic acid), palmitic acid (hexadecanoic acid), stearic acid (octadecanoic acid), arachic acid (eicosanoic acid), behenic acid (docosanoic acid), lignoceric acid (tetracosanoic acid), palmitoleic acid ((Z)-9-hexadecenoic acid), oleic acid ((Z)-9-hexadecenoic acid), elaidic acid ((E)-9-octadecenoic acid), cis-vaccenic acid ((Z)-11-octadecenic acid), linoleic acid ((9Z,12Z)-9,12-octadecadienoic acid), alpha-linolenic acid ((9Z,12Z,15Z)-9,12,15-octadecatrienoic acid), gamma-linolenic acid ((6Z,9Z,12Z)-6,9,12-octadecatrienoic acid), di-homo-gamma-linolenic acid ((8Z,11Z,14Z)-8,11,14-eicosatrienoic acid), arachidonic acid ((5Z,8Z,11Z,14Z)-5,8,11,14-eicosatetraenoic acid), erucic acid ((Z)-13-docosenoic acid), nervonic acid ((Z)-15-tetracosenoic acid), ricinoleic acid, hydroxystearic acid and undecenylic acid, and also mixtures thereof, for example rapeseed oil acid, soya fatty acid, sunflower fatty acid, peanut fatty acid and tall oil fatty acid. Very particular preference is given to palmitic acid and stearic acid, and especially the mixtures of these substances.

Sources of suitable fatty acids or fatty acid esters, in particular glycerides, can be vegetable or animal fat, oils or waxes. For example, it is possible to use: pork lard, beef tallow, goose fat, duck fat, chicken fat, horse fat, whale oil, fish oil, palm oil, olive oil, avocado oil, seed kernel oils, coconut oil, palm kernel oil, cocoa butter, cottonseed oil, pumpkinseed oil, maize kernel oil, sunflower oil, wheatgerm oil, grapeseed oil, sesame oil, linseed oil, soybean oil, peanut oil, lupin oil, rapeseed oil, mustard oil, castor oil, jatropha oil, walnut oil, jojoba oil, lecithin, for example based on soya, rapeseed or sunflowers, bone oil, neatsfoot oil, borage oil, lanolin, emu oil, deer tallow, marmot oil, mink oil, borage oil, safflower oil, hemp oil, pumpkin oil, evening primrose oil, tall oil, and also carnauba wax, beeswax, candelilla wax, ouricury wax, sugarcane wax, retamo wax, caranday wax, raffia wax, esparto wax, alfalfa wax, bamboo wax, hemp wax, Douglas fir wax, cork wax, sisal wax, flax wax, cotton wax, dammar wax, tea wax, coffee wax, rice wax, oleander wax, beeswax or wool wax.

In addition, it may be advantageous when polyfunctional di- and tricarboxylic acids or cyclic anhydrides of the di- and tricarboxylic acids are used for preparation of the polyol esters according to the invention, by means of which polyol polyesters are obtainable. Tetrafunctional and higher-functionality carboxylic acids or the anhydrides thereof are likewise usable with preference in the context of this invention. Preference is given here to aliphatic linear or branched di- and/or tricarboxylic acids having a chain length of 2 to 18 carbon atoms and/or dimer fatty acids that have been obtained by catalytic dimerization of unsaturated fatty acids having 12 to 22 carbon atoms, Examples of corresponding polyfunctional acids are oxalic acid, malonic acid, succinic acid, glutaric acid, adipic acid, pimelic acid, suberic acid, azelaic acid, sebacic acid, brassylic acid, thapsic acid, tartronic acid, tartaric acid, malic acid or citric acid. Especially preferably, polyfunctional di- and tricarboxylic acids are used in combination with monofunctional carboxylic acids as described above, by means of which partly crosslinked polyol esters are obtainable.

In a particularly preferred embodiment of the present invention, the polyol esters are selected from the group of the sorbitan esters and/or polyglycerol esters. Very particular preference is given to polyglycerol esters, in particular polyglycerol palmitate and polyglycerol stearate and mixtures of these substances.

Especially preferred here are polyglycerol esters corresponding to the general formula 1:

  Formula 1 where
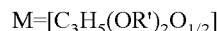
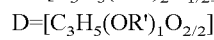

a=1 to 10, preferably 2 to 3, especially preferably 2, b=0 to 10, preferably greater than 0 to 5, especially preferably 1 to 4, c=0 to 3, preferably 0, where the R' radicals are independently identical or different radicals of the R''—C(O)-form or H, where R'' is a monovalent aliphatic saturated or unsaturated hydrocarbyl radical having 3 to 39 carbon atoms, preferably 7 to 21 and more preferably 9 to 17 carbon atoms, where at least one R' radical corresponds to a radical of the R''—C(O)— form.

Even more preferred are polyglycerol esters corresponding to the general formula 2:

  Formula 2 where
M=
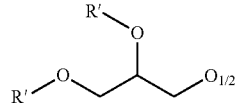

D=
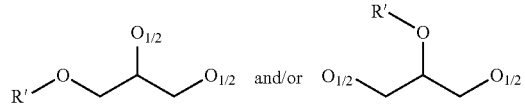

T=
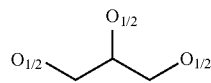

x=1 to 10, preferably 2 to 3, especially preferably 2, y=0 to 10, preferably greater than 0 to 5, especially preferably 1 to 4, z=0 to 3, preferably greater than 0 to 2, especially preferably 0, with the proviso that at least one R' radical is not hydrogen, still R' as defined under formula 1.

Further preferred are polyglycerol esters of the general formula 3:

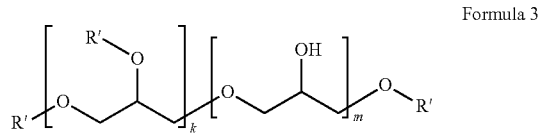  Formula 3 where
k=1 to 10, preferably 2 to 3, especially preferably 2, m=0 to 10, preferably greater than 0 to 5, especially preferably 1 to 3, with the proviso that at least one of the R' radicals is a radical of the R''—C(O)-form, and that the sum total of k+m is greater than zero and the fragments having the indices k and m are distributed statistically.

In the context of the present invention, the term "polyglycerol" is especially understood to mean a polyglycerol which may also contain glycerol. Consequently, for the purposes of calculating amounts, masses and the like, any glycerol fraction should also be taken into consideration. In the context of the present invention, polyglycerols are therefore also mixtures comprising at least one glycerol oligomer and glycerol. Glycerol oligomers should be understood in each case to mean all relevant structures, i.e., for example, linear, branched and cyclic compounds.

Random distributions are composed of blocks with any desired number of blocks and with any desired sequence, or randomized distribution; they can also have an alternating structure, or else form a gradient along the chain; in particular, they can also constitute any of the mixed forms in which groups of different distributions can optionally follow one another. The nature of specific embodiments can result in restrictions to the random distributions. In all regions unaffected by the restriction there is no change to the random distribution.

Preferably, the polyglycerol esters usable in accordance with the invention have not more than 4, more preferably not more than 3 and even further preferably not more than 2 R' radicals of the R"—C(O)— form. Especially preferably, the R' radical is selected from the group of the carboxylic acids as described above.

In a likewise preferred embodiment of the present invention, polyglycerol esters used as additives in aqueous polymer dispersions are those obtainable by the reaction of at least one polyglycerol with at least one carboxylic acid as described above. Suitable reaction conditions for this reaction are temperatures preferably between 200 and 260° C. and preferably a reduced pressure in the range between 20 and 800 mbar, preferably between 50 and 500 mbar, which enables easier removal of water.

In structural terms, the polyol esters can be characterized via wet-chemical indices, for example their hydroxyl number, their acid number and their hydrolysis number. Suitable methods for determining the hydroxyl number are particularly those according to DGF C-V 17 a (53), Ph. Eur. 2.5.3 Method A and DIN 53240. Suitable methods for determining the acid number are particularly those according to DGF C-V 2, DIN EN ISO 2114, Ph. Eur. 2.5.1, ISO 3682 and ASTM D 974. Suitable methods for determining the hydrolysis number are particularly those according to DGF C-V 3, DIN EN ISO 3681 and Ph. Eur. 2.5.6.

It is preferable in accordance with the invention and corresponds to a particularly preferred embodiment of the invention when, for preparation of the polyglycerol ester, a polyglycerol having a mean degree of condensation of 1-20, preferably of 2-10 and more preferably of 2.5-8 is used. The mean degree of condensation N can be determined here on the basis of the OH number (OHN, in mg KOH/g) of the polyglycerol and is linked thereto according to:

$$N = \frac{112200 - 18 \cdot OHN}{75 \cdot OHN - 56100}$$

The OH number of the polyglycerol can be determined here as described above. Consequently, preferred polyglycerols for preparation of the polyglycerol esters according to the invention are preferably those which have an OH number of 1829 to 824, more preferably of 1352-888 and especially preferably of 1244-920 mg KOH/g.

The polyglycerol used can be provided here by different conventional methods, for example polymerization of glycidol (e.g. base-catalysed), polymerization of epichlorohydrin (for example in the presence of a base such as NaOH) or polycondensation of glycerol. According to the invention, preference is given to the provision of the polyglycerol by the condensation of glycerol, especially in the presence of catalytic amounts of a base, especially NaOH or KOH. Suitable reaction conditions are temperatures between 200 and 260° C. and reduced pressure in a range between 20 and 800 mbar, especially between 50 and 500 mbar, which enables easier removal of water. Moreover, various commercial polyglycerols are obtainable, for example from Solvay, Inovyn, Daicel and Spiga Nord S.p.A.

Both the reaction of polyglycerol and carboxylic acids, especially fatty acid and/or fatty acid esters (e.g. triglycerides), and the provision of the polyglycerol can be effected by widely practised processes that are familiar to the person skilled in the art. Corresponding processes are described, for example, in Römpp—Chemie Lexikon (Thieme-Verlag, 1996).

Preferred sorbitan esters in the context of this invention are those which have been obtained by reaction of sorbitol or aqueous sorbitol solutions with at least one carboxylic acid as described above at temperatures of 200-260° C., optionally in the presence of suitable catalysts, giving primarily mixtures of 1,4- and 1,5-sorbitan esters. Corresponding processes are described, for example, in Römpp—Chemie Lexikon (Thieme-Verlag, 1996).

It has already been made clear that the term "polyol esters" in the context of the entire present invention also encompasses the ionic derivatives thereof, preferably the phosphorylated and sulphated derivatives, especially phosphorylated polyol esters. Phosphorylated polyol esters are obtainable here by reaction of the polyol esters with a phosphorylating reagent and optional, preferably obligatory, subsequent neutralization (cf. especially Industrial Applications of Surfactants. II. Preparation and Industrial Applications of Phosphate Esters. Edited by D. R. Karsa, Royal Society of Chemistry, Cambridge, 1990). Preferred phosphorylating reagents in the context of this invention are phosphorus oxychloride, phosphorus pentoxide ($P_4O_{10}$) and more preferably polyphosphoric acid. The term "phosphorylated polyol esters" over the entire scope of the present invention also covers the partly phosphorylated polyol esters, and the term "sulphated polyol esters" over the entire scope of the present invention also covers the partly sulphated polyol esters.

Furthermore, it is also possible to obtain ionic derivatives of the polyol esters in the context of the overall present invention by reaction of the polyesters with di- or tricarboxylic acid or corresponding cyclic anhydrides, more preferably succinic anhydride, and optional, preferably obligatory, neutralization. These polyol esters are usable with particular preference in the context of the present invention.

Futhermore, it is also possible to obtain ionic derivatives of the polyol esters in the context of the overall present invention by reaction of the polyesters with unsaturated di- or tricarboxylic acid or corresponding cyclic anhydrides and subsequent sulphonation and optional, preferably obligatory, neutralization. These polyol esters are also usable with particular preference in the context of the present invention.

The term "neutralization" over the entire scope of the present invention also covers partial neutralization. For neutralization, including partial neutralization, it is possible to use customary bases. These include the water-soluble metal hydroxides, for example barium hydroxide, strontium hydroxide, calcium hydroxide, thallium(I) hydroxide and preferably the hydroxides of the alkali metals that dissociate into free metal and hydroxide ions in aqueous solutions, especially NaOH and KOH. These also include the anhydro bases which react with water to form hydroxide ions, for example barium oxide, strontium oxide, calcium oxide, lithium oxide, silver oxide and ammonia. As well as these aforementioned alkalis, substances usable as bases are also those which likewise give an alkaline reaction on dissolution in water without having HO— (in the solid compound); examples of these include amines such as mono-, di- and trialkylamines, which may also be functionalized alkyl radicals as, for example, in the case of amide amines, mono-, di- and trialkanolamines, mono-, di- and triaminoalkylamines, and, for example, the salts of weak acids, such as potassium cyanide, potassium carbonate, sodium carbonate, trisodium phosphate, etc.

In relation to ionic derivatives of the polyol esters according to the invention, very particular preference is given to phosphorylated sorbitan esters and/or phosphorylated polyglycerol esters, in particular phosphorylated polyglycerol esters. More particularly, phosphorylated and neutralized polyglycerol stearate and polyglycerol palmitate and mixtures of the two substances are preferred ionic derivatives of polyol esters in the context of this invention.

A particularly preferred embodiment of this invention envisages the use in accordance with the invention of polyol esters of the formula 1, 2 and/or 3, as specified above, with the additional proviso that they have been (at least partly) phosphorylated, such that these polyesters of the formula 1, 2 and/or 3 especially bear at least one $(R'''O)_2P(O)$— radical as the R' radical, where the R''' radicals are independently cations, preferably $Na^+$, $K^+$ or $NH_4^+$, or ammonium ions of mono-, di- and trialkylamines, which may also be functionalized alkyl radicals as, for example, in the case of amide amines, of mono-, di- and trialkanolamines, of mono-, di- and triaminoalkylamines, or H or R'''—O—, where R''' is a monovalent aliphatic saturated or unsaturated hydrocarbyl radical having 3 to 39 carbon atoms, preferably 7 to 22 and more preferably 9 to 18 carbon atoms or a polyol radical.

In the case of the sulphated polyol esters, preference is given especially to those obtainable by reaction of the polyol esters with sulphur trioxide or amidosulphonic acid. Preference is given here to sulphated sorbitan esters and/or sulphated polyglycerol esters, especially sulphated polyglycerol stearate and sulphated polyglycerol palmitate and mixtures of these two substances. In a particularly preferred embodiment of the present invention, polyesters are not used in neat form but in a blend with at least one co-surfactant as additives in aqueous polymer dispersions. Co-surfactants preferred in accordance with the invention are, for example, fatty acid amides, alcohol alkoxylates, for example fatty alcohol ethoxylates, nonylphenol ethoxylates, ethylene oxide-propylene oxide block copolymers, betaines, for example amidopropyl betaines, amine oxides, quaternary ammonium surfactants or amphoacetates. In addition, the co-surfactant may comprise silicone-based surfactants, for example trisiloxane surfactants or polyether siloxanes.

Especially preferred co-surfactants are ionic, preferably anionic, co-surfactants. Preferred an ionic co-surfactants here are the ammonium and/or alkali metal salts of fatty acids, alkyl sulphates, alkyl ether sulphates, alkylsulphonates, alkylbenzenesulphonates, alkyl phosphates, alkyl sulphosuccinates, alkyl sulphosuccinamates and alkyl sarcosinates. Especially preferred here are alkyl sulphates having 12-20 carbon atoms, more preferably having 14-18 carbon atoms, even more preferably having more than 16-18 carbon atoms, In the case of ammonium and/or alkali metal salts of fatty acid, it is preferable when they contain less than 25% by weight of stearate salts, and are especially free of stearate salts.

In the case of use of co-surfactants, it is especially preferable when the proportion of co-surfactant based on the total amount of polyol ester plus co-surfactant is in the range of 0.1-50% by weight, preferably in the range of 0.2-40% by weight, more preferably in the range of 0.5-30% by weight, even more preferably in the range of 1-25% by weight.

As already described, the present invention provides for the use of polyol esters as additives in aqueous polymer dispersions for production of porous polymer coatings. The polymer dispersions here are preferably selected from the group of aqueous polystyrene dispersions, polybutadiene dispersions, poly(meth)acrylate dispersions, polyvinyl ester dispersions and polyurethane dispersions. The solids content of these dispersions is preferably in the range of 20-70% by weight, more preferably in the range of 25-65% by weight. Particular preference is given in accordance with the invention to the use of polyol esters as additives in aqueous polyurethane dispersions. Especially preferable here are polyurethane dispersions based on polyester polyols, polyester amide polyols, polycarbonate polyols, polyacetal polyols and polyether polyols.

The use concentration of the polyol esters according to the invention in aqueous polymer dispersions is preferably in the range of 0.2-15% by weight, more preferably in the range of 0.4-10% by weight, especially preferably in the range of 0.5-7.5% by weight, based on the total weight of the dispersion.

The polyol esters can be added to the aqueous dispersion either neat or diluted in a suitable solvent. Preferred solvents here are selected from water, propylene glycol, dipropylene glycol, polypropylene glycol, butyldiglycol, butyltriglycol, ethylene glycol, diethylene glycol, polyethylene glycol, polyalkylene glycols based on EO, PO, BO and/or SO, and mixtures of these substances. In the case of aqueous solutions or blends of the polyol esters of the invention, it may be advantageous when hydrotropic compounds are added to the blend to improve the formulation properties (viscosity, homogeneity, etc.). Hydrotropic compounds here are water-soluble organic compounds consisting of a hydrophilic part and a hydrophobic part, but are too low in molecular weight to have surfactant properties. They lead to an improvement in the solubility or in the solubility properties of organic, especially hydrophobic organic, substances in aqueous formulations. The term "hydrotropic compounds" is known to those skilled in the art. Preferred hydrotropic compounds in the context of the present invention are alkali metal and ammonium toluenesulphonates, alkali metal and ammonium xylenesulphonates, alkali metal and ammonium naphthalenesulphonates, alkali metal and ammonium cumenesulphonates, and phenol alkoxylates, especially phenyl ethoxylates, having up to 6 alkoxylate units.

As well as the polyol esters according to the invention, the aqueous polymer dispersions may also comprise further additives, for example fillers, organic and inorganic pigments, flatting agents, stabilizers such as hydrolysis or UV stabilizers, antioxidants, absorbers, crosslinkers, levelling additives, thickeners or optionally other co-surfactants as described above.

In the context of this invention, very particular preference is given in each case to the inventive use of (a) polyglycerol esters, especially polyglycerol palmitate and/or polyglycerol stearate, in a blend with an anionic cosurfactant, preferably alkyl sulphates, most preferably cetearyl sulphate, or of (b) reaction products of the polyglycerol esters with di- or tricarboxylic acid or corresponding cyclic anhydrides, more preferably succinic anhydride, and subsequent neutralization, such as, more particularly, alkali metal polyglycerol palmitate succinate and/or alkali metal polyglycerol stearate succinate, or of (c) phosphorylated and neutralized polyglycerol stearate and/or phosphorylated and neutralized polyglycerol palmitate.

Advantageously, the polyglycerol esters according to the invention, especially the abovementioned species, are used as additives in aqueous polymer dispersions as a blend in a solvent, the solvent used most preferably being water. It is in turn preferable here when corresponding blends contain 10%-50% by weight, more preferably 15%-40% by weight, even more preferably 20%-30% by weight, of the polyglycerol esters according to the invention.

Preferably, the polyol esters according to the invention are used in aqueous polymer dispersions as foaming aids or foam stabilizers for foaming of the dispersions. In addition, however, they can also be used as drying aids, levelling additives, wetting agents and rheology additives.

Since, as described above, the polyol esters lead to a distinct improvement in porous polymer coatings produced from aqueous polymer dispersions, the present invention likewise provides aqueous polymer dispersions comprising at least one of the polyol esters of the invention, as described in detail above.

The present invention still further provides porous polymer layers which have been produced from aqueous polymer dispersions, obtained using the polyol esters according to the invention as additives, as described in detail above.

Preferably, the porous polymer coatings according to the invention can be produced by a process comprising the steps of a) providing a mixture comprising an aqueous polymer dispersion, as described above, at least one of the polyol esters according to the invention and optionally further additives, b) foaming the mixture to give a homogeneous, fine-cell foam, c) optionally adding at least one thickener to establish the viscosity of the wet foam, d) applying a coating of the foamed polymer dispersion to a suitable carrier, e) drying the coating.

With a view to preferred configurations, especially with a view to the polyol esters usable with preference in the process and aqueous polymer dispersions usable with preference, reference is made to the preceding description and also to the aforementioned preferred embodiments.

It is made clear that the process steps of the process according to the invention as set out above are not subject to any fixed sequence in time. For example, process step c) can be executed at an early stage, at the same time as process step a).

It is a preferred embodiment of the present invention when, in process step b), the aqueous polymer dispersion is foamed by the application of high shear forces. The foaming can be effected here with the aid of shear units familiar to the person skilled in the art, for example Dispermats, dissolvers, Hansa mixers or Oakes mixers.

It is additionally preferred when the wet foam produced at the end of process step c) has a viscosity of at least 3, preferably of at least 5, more preferably of at least 7.5 and even more preferably of at least 10 Pa·s. The viscosity of the foam can be determined here, for example, with the aid of a Brookfield viscometer, LVTD model, equipped with an LV-4 spindle. Corresponding test methods for determination of the wet foam viscosity are known to those skilled in the art.

As already described above, additional thickeners can be added to the system to adjust the wet foam viscosity.

Preferably, the thickeners which can be used advantageously in the context of the invention are selected here from the class of the associative thickeners. Associative thickeners here are substances which lead to a thickening effect through association at the surfaces of the particles present in the polymer dispersions. The term is known to those skilled in the art. Preferred associative thickeners are selected here from polyurethane thickeners, hydrophobically modified polyacrylate thickeners, hydrophobically modified polyether thickeners and hydrophobically modified cellulose ethers. Very particular preference is given to polyurethane thickeners. In addition, it is preferable in the context of the present invention when the concentration of the thickeners based on the overall composition of the dispersion is in the range of 0.01-10% by weight, more preferably in the range of 0.05-5% by weight, most preferably in the range of 0.1-3% by weight.

In the context of the present invention, it is additionally preferable when, in process step d), coatings of the foamed polymer dispersion with a layer thickness of 10-10,000 µm, preferably of 50-5000 µm, more preferably of 75-3000 µm, even more preferably of 100-2500 µm, are produced. Coatings of the foamed polymer dispersion can be produced by methods familiar to the person skilled in the art, for example knife coating. It is possible here to use either direct or indirect coating processes (called transfer coating).

It is also preferable in the context of the present invention when, in process step e), the drying of the foamed and coated polymer dispersion is effected at elevated temperatures. Preference is given here in accordance with the invention to drying temperatures of min. 50° C., preferably of 60° C., more preferably of at least 70° C. In addition, it is possible to dry the foamed and coated polymer dispersions in multiple stages at different temperatures, in order to avoid the occurrence of drying defects. Corresponding drying techniques are widespread in industry and are known to those skilled in the art.

As already described, process steps c)-e) can be effected with the aid of widely practised methods known to those skilled in the art. An overview of these is given, for example, in "Coated and laminated Textiles" (Walter Fung, CR-Press, 2002).

In the context of the present invention, preference is given especially to those porous polymer coatings comprising polyol esters, having a mean cell size less than 250 µm, preferably less than 150 µm, especially preferably less than 100 µm, most preferably less than 75 µm. The mean cell size can preferably be determined by microscopy, preferably by electron microscopy. For this purpose, a cross section of the porous polymer coating is viewed by means of a microscope with sufficient magnification and the size of at least 25 cells is ascertained. In order to obtain sufficient statistics for this evaluation method, the magnification of the microscope chosen should preferably be such that at least 10×10 cells are present in the observation field. The mean cell size is then calculated as the arithmetic mean of the cells or cell sizes viewed. This determination of cell size by means of a microscope is familiar to the person skilled in the art.

The porous polymer layers (or polymer coatings) according to the invention, comprising polyol esters, can be used, for example, in the textile industry, for example for synthetic leather materials, in the building and construction industry, in the electronics industry, for example for foamed seals, in the sports industry, for example for production of sports mats, or in the automotive industry.

The present invention further provides phosphorylated polyol esters obtainable by the esterification of a polyol, preferably polyglycerol and/or sorbitan, with at least one carboxylic acid and subsequent reaction with a phosphorylating reagent and optional, preferably obligatory, subsequent neutralization, where the phosphorylating reagent especially comprises phosphorus oxychloride, phosphorus pentoxide (P4O10) and/or polyphosphoric acid. The term "phosphorylated polyol esters" again encompasses, here and hereinafter, the partly phosphorylated polyol esters. The term "neutralization" again encompasses, here and hereinafter, partial neutralization. Preferred bases usable for neutralization have already been recited further up.

With regard to preferred configurations, especially with a view to polyols and carboxylic acids usable with preference, reference is made completely to the preceding description and preferred configurations mentioned therein, in order to avoid unnecessary repetition.

Particularly preferred phosphorylated polyol esters are phosphorylated polyglycerol esters, preferably phosphorylated and neutralized polyglycerol esters, especially phosphorylated and neutralized polyglycerol palmitate, phosphorylated and neutralized polyglycerol stearate or a mixture of these substances. Likewise particularly preferred are phosphorylated sorbitan esters, preferably phosphorylated and neutralized sorbitan esters.

Polyglycerols used with preference for preparation of the polyglycerol esters have an OH number of 1829 to 824, more preferably of 1352-888 and especially preferably of 1244-920 mg KOH/g.

Phosphorylated polyol esters, preferably phosphorylated polyglycerol esters, especially phosphorylated and neutralized polyglycerol esters, enable very particularly efficient foaming of PUD systems, associated with all the advantages cited at the outset.

The aforementioned subject-matter, phosphorylated polyol esters, is usable in a highly advantageous manner for implementation of the subject-matter of the process according to the invention and of the polymer coating according to the invention.

The present invention further provides sulphated polyol esters, especially sulphated polyglycerol esters, preferably obtainable by reacting the polyol esters, preferably polyglycerol esters, with sulphur trioxide or amidosulphonic acid. These too enable very particularly efficient foaming of PUD systems, associated with all the advantages cited at the outset. This subject-matter too, sulphated polyol esters, is usable in a highly advantageous manner for implementation of the subject-matter of this invention.

The invention further provides phosphorylated polyol esters obtainable by (a) the esterification of a polyol, preferably polyglycerol and/or sorbitan, especially polyglycerol, with at least one carboxylic acid and (b) subsequent reaction with a phosphorylating reagent and (c) optional, preferably obligatory, subsequent neutralization, where the phosphorylating reagent especially comprises phosphorus oxychloride, phosphorus pentoxide ($P_4O_{10}$) and/or polyphosphoric acid.

In a preferred embodiment of the invention, it is a feature of the phosphorylated polyol ester that it is a phosphorylated polyglycerol ester and/or phosphorylated sorbitan ester, preferably phosphorylated and neutralized polyglycerol ester and/or phosphorylated and neutralized sorbitan ester, especially a phosphorylated and neutralized polyglycerol palmitate, a phosphorylated and neutralized polyglycerol stearate or a mixture of these substances.

When the polyglycerol used for preparation of the polyglycerol esters has an OH number of 1829 to 824, more preferably of 1352-888 and especially preferably of 1244-920 mg KOH/g, this is again a preferred embodiment of the invention.

With regard to further preferred configurations, reference is made to the preceding description.

The invention further provides a phosphorylated polyglycerol ester corresponding to the general formula 1a:

 Formula 1a where
$M=[C_3H_5(OR')_2O_{1/2}]$
$D=[C_3H_5(OR')_1O_{2/2}]$
$T=[C_3H_5O_{3/2}]$
a=1 to 10, preferably 2 to 3, especially preferably 2,
b=0 to 10, preferably greater than 0 to 5, especially preferably 1 to 4,
c=0 to 3, preferably 0, where the R' radicals are independently identical or different radicals of the $(R'''O)_2P(O)-$, $R''-C(O)-$ form or H, where R'' is a monovalent aliphatic saturated or unsaturated hydrocarbyl radical having 3 to 39 carbon atoms, preferably 7 to 21 and more preferably 9 to 17 carbon atoms, where at least one R' radical corresponds to a radical of the $R''-C(O)-$ form and where at least one R' radical corresponds to a radical of the $(R'''O)_2P(O)-$ form, where the R''' radicals are each independently cations, preferably $Na^+$, $K^+$ or $NH_4^+$, or ammonium ions of mono-, di- and trialkylamines, which may also be functionalized alkyl radicals as, for example, in the case of amide amines, of mono-, di- and trialkanolamines, of mono-, di- and triaminoalkylamines, or H or $R'''-O-$, where R''' is a monovalent aliphatic saturated or unsaturated hydrocarbyl radical having 3 to 39 carbon atoms, preferably 7 to 22 and more preferably 9 to 18 carbon atoms or a polyol radical, and/or correspond to the general formula 2a:

 Formula 2a where
M=

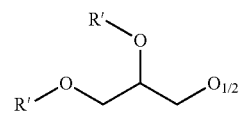

D=

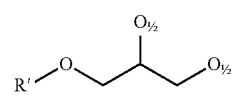 and/or 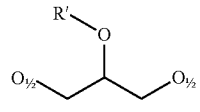

T=

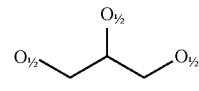

x=1 to 10, preferably 2 to 3, especially preferably 2,
y=0 to 10, preferably 0 greater than to 5, especially preferably 1 to 4,
z=0 to 3, preferably greater than 0 to 2, especially preferably 0, with the proviso that at least one R' radical corresponds to a radical of the R''—C(O)— form and at least one R' radical corresponds to a radical of the (R''O)$_2$P(O)— form, still R' as defined above, and/or correspond to the general formula 3a:

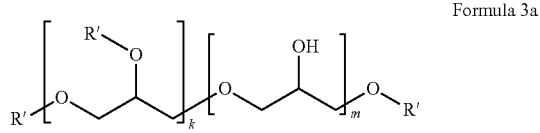

Formula 3a where k=1 to 10, preferably 2 to 3, especially preferably 2, m=0 to 10, preferably greater than 0 to 5, especially preferably 1 to 3, with the proviso that at least one R' radical corresponds to a radical of the R''—C(O)— form and at least one R' radical corresponds to a radical of the (R'''O)$_2$P(O)— form, and that the sum total of k+m is greater than zero and the fragments having the indices k and m are distributed statistically. With regard to preferred configurations, reference is made to the preceding description.

EXAMPLES

Substances:

Impranil® DLU: aliphatic polycarbonate ester-polyether-polyurethane dispersion from Covestro Impranil® DL 1537: aliphatic polyester-polyurethane dispersions from Covestro Impranil® DL 1554: aliphatic polyester-polyurethane dispersions from Covestro Impranil® RSC 1380: polyester-polyurethane dispersion from Covestro Bayhydur® 3100: hydrophilic aliphatic polyisocyanate from Covestro Stokal® STA: ammonium stearate (about 30% in H$_2$O) from Bozzetto Stokal® SR: tallow fat-based sodium sulphosuccinamate (about 35% in H$_2$O) from Bozzetto Tego® Viscoplus 3030: polyurethane-based associative thickener from Evonik Industries AG.

Viscosity Measurements:

All viscosity measurements were conducted with a Brookfield viscometer, LVTD, equipped with an LV-4 spindle, at a constant rotation speed of 12 rpm. For the viscosity measurements, the samples were transferred into a 100 ml jar into which the measurement spindle was immersed. The display of a constant viscometer measurement was always awaited.

Example 1: Synthesis of Polyglycerol Stearate

A mixture of polyglycerol (OHN=1124 mg KOH/g, 103.3 g, 0.431 mol) and technical-grade stearic acid (palmitic acid:stearic acid=50:50; 155.0 g, 0.574 mol) was heated to 240° C. while stirring and the water that formed was distilled off continuously until an acid number of 1.0 mg KOH/g was attained. The polyglycerol stearate obtained had the following indices:

Acid number: 1.0 mg KOH/g; hydrolysis number: 129 mg KOH/g; hydroxyl number: 345 mg KOH/g.

Example 2: Synthesis of Phosphorylated Polyglycerol Stearate

A mixture of a polyglycerol stearate (97.62 g) obtained as described in Example 1 and polyphosphoric acid (115% H$_3$PO$_4$, 2.38 g) was heated to 80° C. while stirring for 4 h. Thereafter, the mixture had an acid number of 27.6 mg KOH/g. Subsequently, 45% aqueous KOH solution (9.77 g) was added at 80° C. and the mixture was stirred at 80° C. for a further 30 min. The mixture had an acid number of 1.3 mg KOH/g.

Example 3: Synthesis of Potassium Polyglycerol Stearate Succinate

Polyglycerol stearate (300 g) obtained as described in Example 1 was heated to 80° C. and succinic anhydride (9.15 g) was added in portions while stirring over the course of 1 h. The mixture was stirred at 80° C. for a further 2 h until an acid number of 19.8 mg KOH/g had been attained. Subsequently, 12.90 g of a 45% aqueous KOH solution were added and the mixture was stirred for a further 15 min. The potassium polyglycerol stearate succinate obtained had the following characteristics: acid number: 8.8 mg KOH/g.

Example 4: Formulation and Blending of Surfactants According to the Invention The surfactants according to the invention from Examples 1 and 2 were blended according to the compositions detailed in Table 1 and then homogenized at 80° C.:

TABLE 1

| Composition of surfactant blends used hereinafter | | | |
|---|---|---|---|
| | Surfactant 1 | Surfactant 2 | Surfactant 3 |
| Polyglycerol stearate (from Example 1) | 19.7 g | — | — |
| Phosphorylated polyglycerol stearate (from Example 2) | — | 21.3 g | — |
| Potassium polyglycerol stearate succinate (from Example 3) | — | — | 21.3 g |
| Cetearyl sulphate | 1.6 g | — | — |
| Water | 59.1 g | 59.1 g | 56.1 g |
| Propylene glycol | 6.25 g | 6.25 g | 6.25 g |

Example 5

150 g of the dispersion Impranil® DLU were placed in a 500 ml plastic beaker and stirred with the aid of a Pendraulik dissolver equipped with a dissolver disc (0=6 cm) at 500 rpm for 3 min. During this time, the surfactant was added gradually with the aid of a syringe. The exact compositions of the samples are listed in Table 2.

For foaming of the mixtures, the shear rate was then increased to 2000 rpm, ensuring that the dissolver disc was always immersed into the dispersion to a sufficient degree that a proper vortex formed. At this speed, the mixtures were foamed to a volume of about 425 ml. The shear time required for that purpose is likewise noted in Table 2. Thereafter, the shear rate was reduced to 1000 rpm, Tego®

Viscoplus 3030 was added with the aid of a syringe and the mixture was sheared for another 15 min. In this step, the dissolver disc was immersed into the mixtures to such an extent that no further air was introduced into the system, but the complete volume was still in motion.

TABLE 2

Overview of the foams produced in Example 4

|  | Sample 1 | Sample 2 | Sample 3 | Sample 4 |
|---|---|---|---|---|
| Impranil ® DLU | 150 g | 150 g | 150 g | 150 g |
| Stokal ® STA | 2.4 g | | | |
| Stokal ® SR | 1.8 g | | | |
| Surfactant 1 | | 4 g | | |
| Surfactant 2 | | | 4 g | |
| Surfactant 3 | | | | 4 g |
| Tego ® Viscoplus 3030 | 0.7 g | 0.2 g | 0.2 g | 0.2 g |
| Shear time | 3 min | 4 min | 3.5 min | 3 min |
| Foam viscosity | 14 Pa s | 17.5 Pa s | 16 Pa s | 17 Pa s |
| Cell size of final foam | about 120 μm | about 50 μm | about 50 μm | about 50 μm |

In all cases, fine homogeneous foams were obtained at the end of this foaming operation. It was noticeable that the foams which had been produced with surfactants 1-3 according to the invention had a slightly higher viscosity in spite of a lower thickener concentration (see Table 2). The foams were coated onto a siliconized polyester film with the aid of a film applicator (AB3220 from TQC) equipped with an applicator frame (coat thickness=800 μm) and then dried at 60° C. for 10 min and at 120° C. for a further 5 min.

Compared to sample 1, the dried inventive samples 2-4 featured a more homogeneous macroscopic appearance and a more velvety feel. The cell structure of the dried samples was assessed by means of scanning electron microscopy. It was possible here to determine a mean cell size of about 120 μm in the case of comparative sample 1, whereas the inventive samples 2 and 3 had a much finer cell size of about 50 μm.

Example 6

The compositions listed in Table 2 were foamed analogously to the method described in Example 4 and coated onto a siliconized polyester film by means of an applicator frame (coat thickness=800 μm). This time, however, the samples were dried at 90° C. only for 5 min and at 120° C. for 3 min. It was possible here to observe that comparative sample 1, after drying, had distinct defects (drying cracks), whereas the inventive samples 2-4 could be dried without defects in spite of the shortened, more severe drying conditions.

In addition, for all samples, a coating with a coat thickness of 2000 μm was produced.

These were dried at 60° C. for 10 min, at 90° C. for 10 min and at 120° C. for 10 min. Here too, it was possible to dry samples 2-4 that comprise the surfactants according to the invention without defects, whereas the comparative sample had distinct drying cracks 1.

Example 7

150 g of polyurethane dispersion and optionally 3 g of the polyisocyanate Bayhydur® 3100 were placed in a 500 ml plastic vessel and then, as described in Example 4, foamed, homogenized, coated onto a siliconized polyester film (coat thickness 800 μm) and dried. Tables 3 and 4 give an overview of the respective composition of the samples. All samples after drying showed a more homogeneous appearance than sample 1 produced for comparison in Example 4. Scanning electron microscope analyses of the dried foams showed that the cell size in all cases was in the range of 40-60 μm. These experiments demonstrate the versatile use of the polyglycerol esters according to the invention in a number of different polyurethane dispersions.

In addition, for all samples, a drawdown with a layer thickness of 2000 μm was produced after foaming. These coatings were dried at 60° C. for 10 min, at 90° C. for 10 min and at 120° C. for 10 min. In all cases, the foams could be dried without defects, and homogeneous samples with a velvety feel were obtained. Scanning electron microscope analyses showed that the cell size of all samples here too was in the range of 40-60 μm.

TABLE 3

Overview of the foams produced in Example 6

|  | Sample 4 | Sample 5 | Sample 6 | Sample 7 | Sample 8 | Sample 9 |
|---|---|---|---|---|---|---|
| Impranil ® DL 1537 | 75 g | | | 75 g | | |
| Impranil ® DLU | 75 g | | | 75 g | | |
| Impranil ® DL 1554 | | 150 g | | | 150 g | |
| Impranil ® RSC 1380 | | | 150 g | | | 150 g |
| Bayhydur ® 3100 | | | | 3 g | 3 g | 3 g |
| Surfactant 1 | 4 g | 4 g | 4 g | 4 g | 4 g | 4 g |
| Tego ® Viscoplus 3030 | 0.2 g | 0.1 g | 0.2 g | 0.2 g | 0.1 g | 0.2 g |
| Foam viscosity | 15.7 Pa s | 21.8 Pa s | 16.3 Pa s | 15.5 Pa s | 21.5 Pa s | 16.0 Pa s |

TABLE 4

Overview of the foams produced in Example 6

|  | Sample 10 | Sample 11 | Sample 12 | Sample 13 | Sample 14 | Sample 15 |
|---|---|---|---|---|---|---|
| Impranil ® DL 1537 | 75 g | | | 75 g | | |
| Impranil ® DLU | 75 g | | | 75 g | | |
| Impranil ® DL 1554 | | 150 g | | | 150 g | |
| Impranil ® RSC 1380 | | | 150 g | | | 150 g |
| Bayhydur ® 3100 | | | | 3 g | 3 g | 3 g |

TABLE 4-continued

Overview of the foams produced in Example 6

| | Sample 10 | Sample 11 | Sample 12 | Sample 13 | Sample 14 | Sample 15 |
|---|---|---|---|---|---|---|
| Surfactant 2 | 4 g | 4 g | 4 g | 4 g | 4 g | 4 g |
| Tego ® Viscoplus 3030 | 0.2 g | 0.1 g | 0.1 g | 0.2 g | 0.1 g | 0.1 g |
| Foam viscosity | 15.1 Pa s | 21.1 Pa s | 15.5 Pa s | 14.7 | 20.2 Pa s | 14.3 Pa s |

The invention claimed is:

1. A process for producing a porous polyurethane coating, the process comprising the steps of:
a) providing a mixture comprising an aqueous polyurethane dispersions having a solids content of from 20 to 70% by weight, a concentration of polyglycerol ester in the aqueous polyurethane dispersion in the range of from 0.2-15% by weight based on the total weight of the aqueous polyurethane dispersion, and an additive; wherein the polyglycerol ester is of general formula 1:

$$M_a D_b T_c \quad \text{Formula 1}$$

where
$M=[C_3H_5(OR')_2O_{1/2}]$
$D=[C_3H_5(OR')_1O_{2/2}]$
$T=[C_3H_5O_{3/2}]$
a=2 to 10,
b=0 to 10,
c=0 to 3,
wherein the R' radicals are independently identical or different radicals of R"—C(O)— or H,
wherein R" is a monovalent aliphatic saturated or unsaturated hydrocarbyl radical having from 3 to 39 carbon atoms,
wherein at least one R' radical corresponds to a radical of R"—C(O)—;
b) foaming the mixture to give a cell foam;
c) adding at least one thickener to establish the desired viscosity of the wet foam;
d) applying a coating of the foamed polymer dispersion to a carrier;
e) after performing step d), and without any intervening steps, drying the coating,
wherein the porous polyurethane coating has a mean cell size less than 150 μm.

2. The process according to claim 1, wherein
a=from 2 to 3,
b=from 1 to 4,
c=0,
where the R" radicals are independently identical or different monovalent aliphatic saturated or unsaturated hydrocarbyl radicals having from 6 to 20 carbon atoms,
x=from 2 to 3,
y=from 1 to 4,
z=0,
k=from 2 to 3,
m=from 1 to 3; and
wherein the porous polyurethane coating has a mean cell size less than 120 μm.

3. The process according to Claim [[2111 1, wherein
a=2,
b=from 1 to 4,
c=0,
where the R" radicals are independently identical or different monovalent aliphatic saturated or unsaturated hydrocarbyl radicals having from 8 to 18 carbon atoms,
x=2,
y=from 1 to 4,
z=0,
k=2,
m=from 1 to 3, and
wherein the porous polyurethane coating has a mean cell size less than 100 μm.

4. The process according to claim 1,
wherein the porous polyurethane coating has a mean cell size less than 100 μm.

5. The process according to claim 1, wherein the polyglycerol ester is used in a blend with at least one ionic co-surfactant as additives in aqueous polymer dispersions,
wherein the ionic co-surfactants is selected from the group consisting of ammonium and alkali metal salts of fatty acids, alkyl sulphates, alkyl ether sulphates, alkylsulphonates, alkylbenzenesulphonates, alkyl phosphates, alkyl sulphosuccinates, alkyl sulphosuccinamates and alkyl sarcosinates,
wherein the proportion of ionic co-surfactant based on the total amount of polyglycerol ester plus co-surfactant is in the range of from 0.1-50% by weight.

6. The process according to claim 1, wherein the aqueous polyurethane dispersions has a solids content in the range of from 25 to 65% by weight.

7. The process according to claim 1, wherein the concentration of the polyglycerol ester in the aqueous polyurethane dispersion is in the range of from 0.4 to 10% by weight based on the total weight of the aqueous polyurethane dispersion.

8. The process according to claim 1, wherein the polyglycerol ester serve as foaming aids or foam stabilizers for foaming of the aqueous polyurethane dispersions, and as a drying aid, levelling additive, wetting agent and/or rheology additive.

9. The process according to claim 1, wherein the polyglycerol ester is selected from the group consisting of diglycerol, triglycerol, tetraglycerol, pentaglycerol, dierythritol, trierythritol, tetraerythritol, di(trimethylolpropane), tri(trimethylolpropane) and di- and oligosaccharides.

10. The process according to claim 1, wherein the solids content of the aqueous polyurethane dispersions is in the range of from 25-65% by weight.

11. The process according to claim 1, wherein said polyglycerol ester is of general formula 2:

$$M_x D_y T_z \quad \text{Formula 2}$$

wherein
M=

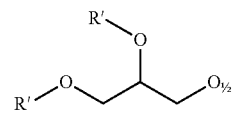

D=

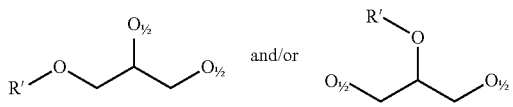

T=

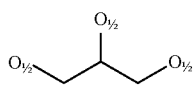

x=2 to 10,
y=0 to 10,
z=0 to 3,
wherein at least one R' radical is not hydrogen.

12. The process according to claim 1, wherein said polyglycerol ester is of general formula 3:

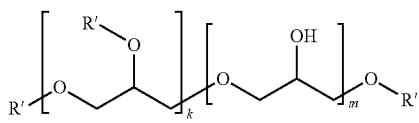

Formula 3 wherein
k=2 to 10,
m=0 to 10,
wherein at least one of the R' radicals is a radical of R"—C(O), and that the sum of k +m is greater than zero.

13. The process according to claim 12, wherein
a=from 2 to 3,
b=from 1 to 4,
c=0,
where the R" radicals are independently identical or different monovalent aliphatic saturated or unsaturated hydrocarbyl radicals having from 6 to 20 carbon atoms,
x=from 2 to 3,
y=from 1 to 4,
z=0,
k=from 2 to 3,
m=from 1 to 3; and
wherein the porous polyurethane coating has a mean cell size less than 120 μm.

14. The process according to claim 12, wherein
a=2,
b=from 1 to 4,
c=0,
where the R" radicals are independently identical or different monovalent aliphatic saturated or unsaturated hydrocarbyl radicals having from 8 to 18 carbon atoms,
x=2,
y=from 1 to 4,
z=0,
k=2,
m=from 1 to 3, and
wherein the porous polyurethane coating has a mean cell size less than 100 μm.

* * * * *